US010841813B2

(12) United States Patent
Iun et al.

(10) Patent No.: US 10,841,813 B2
(45) Date of Patent: Nov. 17, 2020

(54) DEVICE TO GUIDE EQUIPMENT CABLE INSTALLATION BETWEEN RADIO PORTS OF A BASE STATION AND MULTIPLE ANTENNAS

(71) Applicant: Telefonaktiebolaget LM Ericsson (Publ), Stockholm (SE)

(72) Inventors: Edwin Vai Hou Iun, Ottawa (CA); Jeevaradchagan Vishnu, Ottawa (CA); Ping Liu, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 31 days.

(21) Appl. No.: 15/567,452

(22) PCT Filed: Apr. 23, 2015

(86) PCT No.: PCT/IB2015/052979
§ 371 (c)(1),
(2) Date: Oct. 18, 2017

(87) PCT Pub. No.: WO2016/170398
PCT Pub. Date: Oct. 27, 2016

(65) Prior Publication Data
US 2018/0139630 A1    May 17, 2018

(51) Int. Cl.
*H04W 24/02* (2009.01)
*H04L 12/24* (2006.01)
(Continued)

(52) U.S. Cl.
CPC .............. *H04W 24/02* (2013.01); *H04B 3/02* (2013.01); *H04L 41/24* (2013.01); *H04W 88/08* (2013.01);
(Continued)

(58) Field of Classification Search
None
See application file for complete search history.

(56) References Cited

U.S. PATENT DOCUMENTS 8,477,031 B2    7/2013   McNally et al.
8,514,145 B2 *  8/2013   Le Sage ................. H01Q 1/246
                                                      343/894
(Continued)

FOREIGN PATENT DOCUMENTS

WO    2014/161580 A1    10/2014
WO    2015/023768 A1     2/2015

OTHER PUBLICATIONS

Antenna Interface Standards Group Standard No. AISG v2.0 Title: "Control Interface for Antenna Line Devices" Jun. 13, 2006, consisting of 41-pages.
(Continued)

*Primary Examiner* — Steve R Young
(74) *Attorney, Agent, or Firm* — Sage Patent Group

(57) ABSTRACT

A device for guiding connection installation to communicatively connect a plurality of radio ports of a base station to a plurality of antennas is provided. The device includes a connector configured to communicate with a first radio port of the plurality of radio ports of the base station. The device further includes a receiver in communication with the connector. The receiver is configured to receive first configuration data that is communicated from the first radio port of the plurality of radio ports. The first configuration data indicating a next connection for the first radio port toward one of the plurality of antennas. The device further includes a display and a processor in communication with the receiver and the display. The processor is configured to cause the first configuration data to be displayed on the display.

25 Claims, 11 Drawing Sheets

(51) Int. Cl.
*H04B 3/02* (2006.01)
*H04W 88/08* (2009.01)
*H04W 88/12* (2009.01)
*H04W 88/18* (2009.01)

(52) U.S. Cl.
CPC ........... *H04W 88/12* (2013.01); *H04W 88/18* (2013.01); *H04W 88/085* (2013.01)

(56) References Cited

U.S. PATENT DOCUMENTS

| | | | |
|---|---|---|---|
| 9,414,224 B1* | 8/2016 | Schmidt | H04W 12/02 |
| 2009/0292416 A1* | 11/2009 | Ubik | H04W 24/00 |
| | | | 701/32.8 |
| 2010/0120415 A1* | 5/2010 | Urquhart | H01Q 1/1257 |
| | | | 455/424 |
| 2011/0043371 A1 | 2/2011 | German et al. | |
| 2014/0141728 A1* | 5/2014 | Devarasetty | H04B 17/18 |
| | | | 455/67.14 |
| 2014/0229612 A1* | 8/2014 | Chandrashekar | H04L 43/10 |
| | | | 709/224 |
| 2015/0327087 A1* | 11/2015 | Xu | H04W 64/003 |
| | | | 455/424 |
| 2017/0250860 A1* | 8/2017 | Kim | H04L 41/0843 |
| 2019/0237881 A1* | 8/2019 | Zhao | H01Q 21/0025 |

OTHER PUBLICATIONS

3GPP TS 25.462 V12.0.0 (Sep. 2014) 3rd Generation Partnership Project; Technical Specification Group Radio Access Network; UTRAN Iuant Interface: Signalling Transport (Release 12) Sep. 2014 consisting of 21-pages.

International Search Report and Written Opinion of the International Searching Authority dated Feb. 18, 2016 issued in corresponding PCT Application Serial No. PCT/IB2015/052979, filed Apr. 23, 2015, consisting of 8-pages.

* cited by examiner

DEVICE TO GUIDE EQUIPMENT CABLE INSTALLATION BETWEEN RADIO PORTS OF A BASE STATION AND MULTIPLE ANTENNAS

CROSS-REFERENCE TO RELATED APPLICATIONS

This application is a Submission Under 35 U.S.C. § 371 for U.S. National Stage Patent Application of International Application Number: PCT/IB2015/052979, filed Apr. 23, 2015 entitled "DEVICE TO GUIDE EQUIPMENT CABLE INSTALLATION BETWEEN RADIO PORTS OF A BASE STATION AND MULTIPLE ANTENNAS" the entirety of which is incorporated herein by reference.

TECHNICAL FIELD

A method, system and device cable installation, and in particular, to guiding communication equipment cable connection installation and detecting errors in cable connection installation.

BACKGROUND

As demand on wireless networks continue to grow, network operators are facing the challenge of rapidly increasing the capacity of the wireless networks. Network operators have been increasing capacity by adding more equipment. Even though more equipment is being added to cell sites to increase capacity, the number of cell sites remains relatively the same. In other words, network operators are adding more equipment to existing cell sites. In some instances, a cell site may be loaded with multiple stacks of equipment to increase capacity.

However, this increase in equipment at a cell site has led to exponential growth in the number of cables, e.g., Radio Frequency (RF) cables, at the cell site. These RF cables are used to interconnect the ports of the radios to the antennas, often through multiple hops via distribution patch panels. The increase in the number of cables at the cell site becomes a major challenge to the network operator as the network operator has to somehow ensure that voluminous amounts of cables are connected correctly and in a timely fashion. This is not an easy task given that number of cables and the fact that the cables look like each other.

Existing solutions to this cable problem are simply not effective. One solution includes color coding or labeling each cable. This labeling solution helps with visual inspection. However, this is a time consuming solution since each cable has to be verified individually at both connection ends. Further, this labeling solution is still prone to human error especially if the installer has to stop in the middle of installation and return the next day or if the installation needs to be completed by a different work crew. Further, the labeling itself may physically peel off or fade, thereby rending this solution impractical.

Also, this labeling solution requires up-to-date color coded connectivity diagrams so that installation crews can determine which color goes where. However, bringing color coded connectivity diagrams up to the top of a cell tower where the antennas are located can be difficult as the installer has to hold and try to read the diagram, often in windy conditions at a height of fifty to two hundred feet from the ground. Further, there is no automatic or real-time procedure to verify the information in the diagram is even current.

Another existing solution relies on performance testing and Key Performance Indicator (KPI) statistics to indicate problems with performance degradation. However, since cable misconnection can be one of the many factors contributing to performance degradation, this makes post-installation trouble shooting using such performance testing too time consuming and costly. For example, while there may be throughput degradation or hand-off error, pinpointing that the error/degradation is actually due to feeder misconnection is difficult as it is a trial and error process of elimination. Also, this solution requires additional site visits to fix the problem in which each site visit can be very expensive.

Another existing solution involves a device level check after installation such as an Antenna Interface Standards Group (AISG) site scan. The device level check is performed by a request for a "connectivity check" by a remote user. Since RF, AISG and Direct Current (DC) power travel over the same cable and connector, the existing AISG signaling is used to check RF connectors. This scanning solution can use an AISG controller to record the connection statuses per tower device. While this scanning solution can provide a connection map and flag connection errors based on the recorded connection statuses, it can only do so after the installation/configuration is completed. Therefore, this scanning solution requires a field technician to re-climb the cell tower to fix the problem after complete installation. Further, since all the cables look alike, it may be difficult for the field technician to pinpoint the cable that needs to be replaced or switched.

Further, a major shortcoming to all these solutions involves the multiple reconnection of the cabling itself. Any additional cabling disconnection-reconnection to correct a cabling error may reduce the life span of the cable and connectors. In particular, RF cables can only be reconnected a finite number of times before cable bending and connector insertion causes enough damage to require the RF cable to be replaced. Given that a single RF cable parts and labor can cost thousands of dollars, multiple disconnection-reconnections can result in significant expense to the service provider.

SUMMARY

The disclosure advantageously provides a method, system and device for connection installation guidance. In one embodiment of the disclosure, a device for guiding connection installation to communicatively connect a plurality of radio ports of a base station to a plurality of antennas is provided. The device includes a connector configured to communicate with a first radio port of the plurality of radio ports of the base station. The device further includes a receiver in communication with the connector. The receiver is configured to receive first configuration data that is communicated from the first radio port of the plurality of radio ports. The first configuration data indicating a next connection for the first radio port toward one of the plural of antennas. The device further includes a display and a processor in communication with the receiver and the display. The processor is configured to cause the first configuration data to be displayed on the display.

According to one embodiment of this aspect, the first configuration data includes a connectivity identifier. The connectivity identifier identifies at least one connection toward the one of the plurality of antennas. According to another embodiment of this aspect, the connectivity identifier identifies a plurality of connections required for the first radio port to communicate with the one of the plurality of antennas. According to another embodiment of this aspect, the connector is configured to connect to a connection output of a connection associated with the first radio port of the plurality of radio ports of the base station. The next connection is a first next connection. The connector is further configured to connect to a connection output of the first next connection and receive the first configuration data indicating a second next connection for the first radio port toward the one of the plurality of antennas.

According to another embodiment of this aspect, the first configuration data is communicated in an out of band channel. According to another embodiment of this aspect, the connector is further configured to connect to a second connection output of a second connection associated with a second radio port of the plurality of radio ports of the base station. The receiver is further configured to receive second configuration data that is communicated via the second connection output. The second configuration data is different from the first configuration data and indicates a next connection for the second radio port toward another one of the plurality of antennas. The processor is configured to cause the second configuration data to be displayed on the display. According to another embodiment of this aspect, each of the first and second connections is one of a cable, jumper component, passive component and active component. According to another embodiment of this aspect, the device is configured to receive a power signal from the first radio port of the plurality of radio ports of the base station.

According to another embodiment of this aspect, the device further includes a power source configured to power the device in the absence of the power signal.

According to another embodiment of this aspect, the device further includes a transmitter. The receiver is further configured to receive a verification message communicated from the first radio port of the plurality of radio ports of the base station. The processor is further configured to cause the transmitter to transmit an acknowledgement message to the base station in response to the verification message.

According to another embodiment of this aspect, the acknowledgement message at least one connectivity identifier that identifies at least one configuration toward the one of the plurality of antennas. According to another embodiment of this aspect, the processor is further configured to receive the first configuration data that is communicated from the first radio port of the plurality of radio ports using an Antenna Interface Standard Group, AISG, protocol.

According to another embodiment of this aspect, the device includes a second connector configured to communicate first configuration data toward the one of the plurality of antennas via another connection. According to another embodiment of this aspect, the device includes one of a Radio Frequency (RF) cable and RF jumper device.

According to another embodiment of the disclosure, a method for a device to guide connection installation to communicatively connect a plurality of radio ports of a base station to a plurality of antennas is provided. The device being in communication with a first radio port of the plurality of radio ports of the base station. First configuration data that is communicated from the first radio port of the plurality of radio ports is received. The first configuration data indicates a next connection for the first radio port toward one of the plural of antennas. The first configuration data is caused to be displayed on the display. According to another embodiment of this aspect, the first configuration data includes a connectivity identifier. The connectivity identifier identifies at least one connection toward the one of the plurality of antennas. According to another embodiment of this aspect, the connectivity identifier identifies a plurality of connections required for the first radio port to communicate with the one of the plurality of antennas.

According to another embodiment of this aspect, the next connection is a first next connection. The device is connected to a connection output of the first next connection. The first configuration data indicating a second next connection for the first radio port toward the one of the plurality of antennas is received.

According to another embodiment of this aspect, the first configuration data is communicated in an out of band channel. According to another embodiment of this aspect, the device is connected to a first connection output of a first connection associated with the first radio port of the plurality of radio ports of the base station. The device is further connected to a second connection output of a second connection associated with a second radio port of the plurality of radio ports of the base station. Second configuration data that is communicated via the second connection output is received. The second configuration data is different from the first configuration data and indicating a next connection for the second radio port toward another one of the plurality of antennas. The second configuration data is caused to be displayed on the display.

According to another embodiment of this aspect, each of the first and second connections is one of an antenna cable, jumper component, passive component and active component. According to another embodiment of this aspect, a power signal from the first radio port of the plurality of radio ports of the base station is received.

According to another embodiment of this aspect, receiving a verification message communicated from the first radio port of the plurality of radio ports of the base station is received. An acknowledgement message is transmitted to the base station in response to the verification message. According to another embodiment of this aspect, the acknowledgement message includes at least one connectivity identifier that identifies at least one connection toward the one of the plurality of antennas.

According to another embodiment of this aspect, the first configuration data that is received is communicated from the first radio port of the plurality of radio ports using an Antenna Interface Standard Group, AISG, protocol. According to another embodiment of this aspect, first configuration data is communicated toward the one of the plurality of antennas via another connection. According to another embodiment of this aspect, the device includes one of a Radio Frequency (RF) cable and RF jumper device.

According to another embodiment of the disclosure, a system for guiding connection installation is provided. The system includes a base station. The base station includes a plurality of radio ports, the plurality of radio ports including a first radio port and a base station processor. The base station processor is configured to communicate first configuration data via the first radio port. The system includes a device including a connector configured to communicate with the first radio port of the plurality of radio ports of the base station. The device further includes a receiver in communication with the connector. The receiver configured to receive the first configuration data that is communicated from the first radio port of the plurality of radio ports. The first configuration data indicates a next connection for the radio port toward one of the plurality of antennas. The device further includes a display and a device processor in communication with the receiver and the display. The device processor is configured to cause the first configuration data to be displayed on the display. According to another embodiment of this aspect, the base station processor is further configured to determine that a device is in communication with the first radio port and determine first configuration data based at least in part on the determination that the device is in communication with the first radio port.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
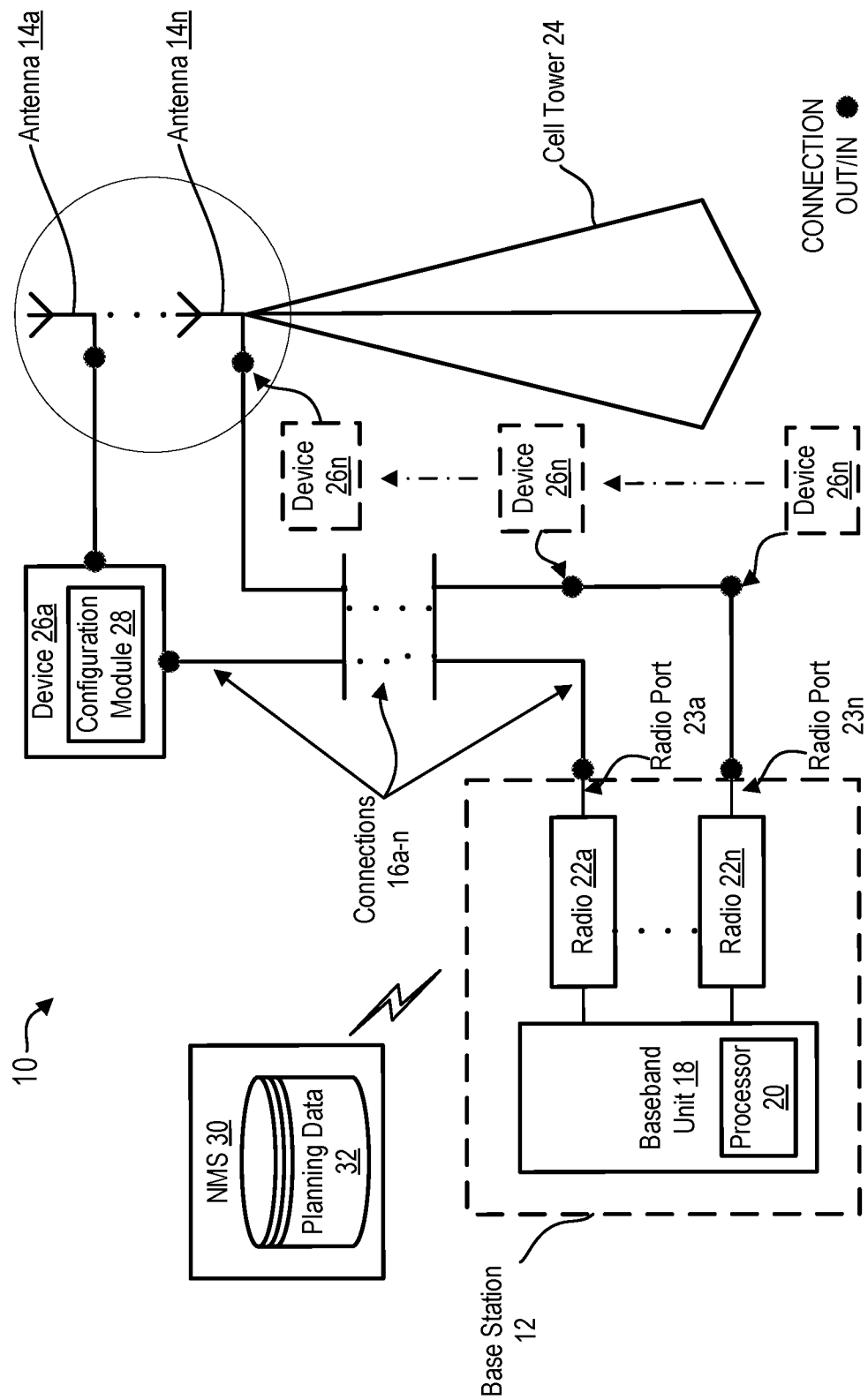
FIG. 1 is a block diagram of an exemplary system for guiding connection installation in accordance with the principles of the disclosure.

The method, system and device described herein advantageously provide cable connection installation guidance. In particular, the method, system and device advantageously allow for dynamic retrieval of connection installation data, i.e., configuration data, that reflects the latest network deployment or cell site configuration, thereby ensuring the field technician is using the most recent cell site configuration during installation. Further, the method, system and device described herein do not require the cell site to be radiating, i.e., transmitting user equipment (UE) traffic and/or control information. In other words, while some of the existing solutions do require the cell site to come into service or be radiating in order to detect symptoms of RF cable misconnection, the method, system and device described herein enables the cell site to be verified before the network operator is providing service to UEs, i.e., before the cell site is radiating or before a regulator license for the cell has been received, thereby allowing flexibility in rolling out or setting up the cell site. For example, the cell site may be set up prior to receiving the regulator license such that once the license is received, the cell site can immediately go active and start radiating.

The method, system and device described herein further advantageously provide a reduction in cost as cables do not require expensive labeling on the "far end" of the connection staring from the radio port since the next hop(s) are indicated to the field technician via the device described herein, thereby cutting cost and dramatically cutting installation time as well. Further, the method, system and device advantageously provide flexibility in on-site workflow because the base station and radio do not need to always be powered since the device described herein can store at least one connection identifier that indicates the next hop(s) of a connection. Therefore, the field technician can stop mid-installation of one communication path from a radio to an antenna, and resume the installation using the information already stored in the device described herein. This feature addresses the reality of work flow installation at a cell site where field technicians may take breaks or may be called away to address a problem, question or situation.

Further, the method, system and device described herein help improve confidence as clear and up-to-date connection guidance is provided to field technicians during cell site configuration. For example, the up-to-date connection guidance may advantageously be distributed in real time through the system, thereby avoiding the need to maintain version synchronization of paper documents or electronic representation of separate paper documents among different parties such as the field technician, contractor, configuration engineer, etc. Further, some connection paths may be very complicated and require multiple hops using various cables and connection devices, e.g., jumper boxes. The method, system and device described herein help guide the field technician through these complicated connection paths. Yet another advantage of the method, system and device described herein is that field technicians can connect the device to the radio ports at the base station in order pre-validate the configuration data before the field technician performs the costly and time consuming cell tower climb to reach the antennas. Further, the reception of AISG signaling described herein provides validation of cable connectivity throughout a connection path from radio to antenna, i.e., validates cable connectivity after one or more connection hops.

Further, the method, system and device described herein are not limited to any specific Radio Access Network technology, and are applicable to any infrastructure network such as Global System for Mobile Communications (GSM), Wideband Code Division Multiple Access (WCDMA), Code Division Multiple Access (CDMA), Long Term Evolution (LTE) and radio broadcasting equipment, e.g., television broadcasting equipment. The method, system and device discussed herein can also be used in any interconnection medium such as electrical wiring infrastructure of a building or network cabling such as electrical and optical cabling. Further, the method, system and device are equally applicable to any infrastructure equipment regardless of indoor or outdoor deployment.

Before describing in detail exemplary embodiments that are in accordance with the disclosure, it is noted that the embodiments reside primarily in combinations of apparatus components and processing steps related to guiding cable installation to connect a plurality of radio ports of a base station to a plurality of antennas. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for guiding connection installation to connect a plurality of radio ports of a base station to a plurality of antennas in accordance with the principles of the present disclosure and designated generally as "10." System 10 includes one or more base stations 12 that are to be communicatively coupled to one or more antennas 14a-14n (collectively referred to as antenna 14) via one or more connections 16a-16n (collectively referred to as connection 16). Connection 16 refers to a component that can transmit and receive signals. Connection 16 has at least one connection input for receiving at least one signal and at least one connection output for transmitting at least one signal. In one or more exemplary embodiments, connection 16 is a path or hop that provides connectivity between a connection input and a connection output. Other examples of connection 16 include one or more of a cable, optical cable, electrical cable, Ethernet cable, RF cable, jumper component, RF jumper device, passive component, radio port, antenna port and active component.

Base station 12 includes one or more baseband units 18 that perform baseband processing for receiving data at base station 12 and transmitting data from base station 12. Baseband unit 18 includes one or more processors 20 for performing baseband unit 18 and base station 12 functions described herein. Base station 12 manages one or more radios 22a-n (collectively referred to as radio 22) having one or more radio ports 23a-n (collectively referred to as radio port 23) for transmitting and receiving data. In one embodiment, each radio 22 has one or more respective radio ports 23, each having a respective radio port address such that data may be addressed to a specific radio port 23, i.e., data addressed to a first radio port 23 of a first radio 22 is transmitted only by the first radio port 23 of the first radio 22.

Antenna 14 transmits data received from radio port 23 of radio 22 via connection 16. In one embodiment, antenna 14 is mounted on cell tower 24. In an alternative embodiment, antenna 14 may be mounted on or within another structure as is known in the corresponding art. In one or more embodiments, connection 16 is connected to other connections 16 and/or device 26 (discussed below), among other communication equipment.

System 10 includes one or more devices 26a-26n (collectively referred to as device 26) for guiding connection installation to connect radio ports 23 of radios 22 of base station 12 to antennas 14. In particular, device 26 may be connected to connection 16 at a connection output or input, radio port 23 and/or other communication equipment in system 10. For example, as illustrated in FIG. 1, device 26a is connected between two connections 16 such that device 26a is part of the connectivity path from radio 22a to antenna 14a. In another example, device 26n is connected to a connection output of first connection 16 associated with radio port 23n of the plurality of radio ports 23 of the base station 12. Device 26n is connected to a connection output of a second connection associated with the first radio port 23n of the plurality of radio ports 23 of the base station 12. In other words, a field technician connects, disconnects and then reconnects device 26n to various connection outputs/inputs as the communication/connectivity path from radio port 23n of radio 22n to antenna 14n is being assembled by field technician according to the connection installation guidance provided by device 26n, as discussed below.

Figure 4:
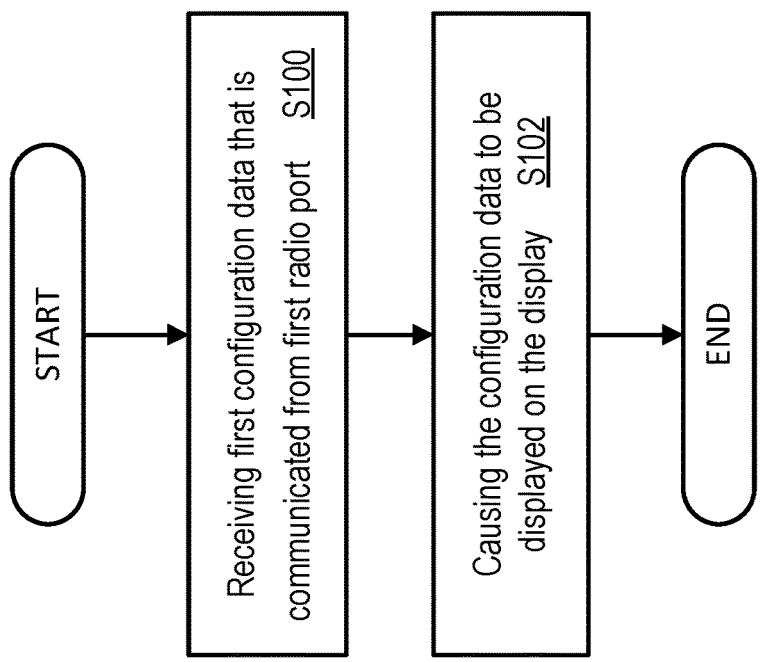
FIG. 4 is a flow diagram of a connection installation guidance process of configuration module in accordance with the principles of the disclosure.
Figure 7:
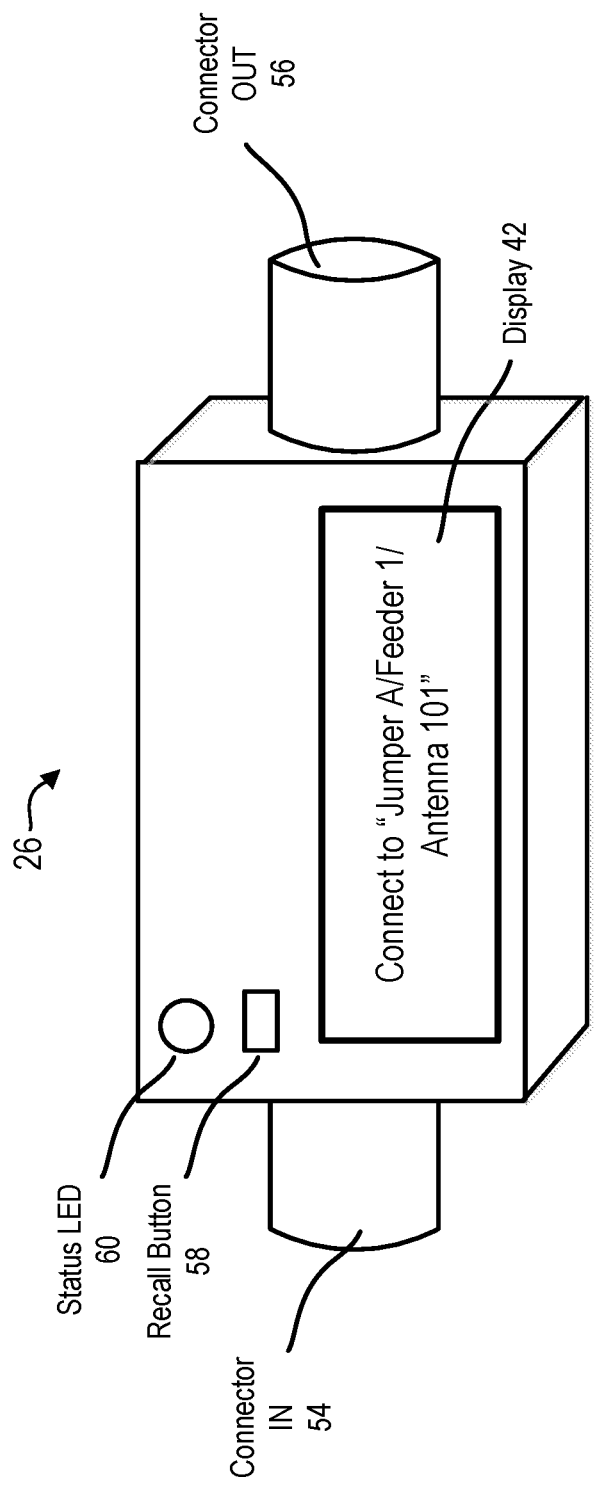
FIG. 7 is one embodiment of the device in accordance with the principles of the disclosure.

Device 26 includes configuration module 28 for guiding connection installation by indicating at least one next hop of connection 16 as discussed in detail with respect to FIG. 4. One embodiment of device 26 is discussed in detail with respect to FIG. 7. In one or more embodiments, multiple devices 26, are connected along various cable paths in order to provide connectivity path validation functionality as discussed in detail with respect to FIG. 12. In one or more alternative embodiments, a single device 26, e.g., device 26n, may be used for providing connection installation guidance as discussed herein.

Further, while device 26 is illustrated as being a stand-alone device, one or more devices 26 may be built into one or more connections 16 such as a jumper box, jumper device and/or cable. In one embodiment, device 26 and connection 16 are the same active device, smart device or active component that intercept configuration data transmitted along the communication path and provide the intercepted data to network management system (NMS) 30 such that NMS 30 can have an update-to-date global view of the connection installation and can monitor for errors. In one or more embodiments, smart devices physical connection setup is based on received configuration data. For example, connection 16 such as an RF switchbox having device 26 functionality and having been pre-cabled can be reconfigured by NMS 30 via base station 12 without the field technician at the site. Such an embodiment allows for remote configuration and reconfiguration by the transmission of configuration data to the smart device having device 26 functionality.

Network management system (NMS) 30 is configured to manage network components. NMS 30 is in communication with base station 12. In one or more embodiments, NMS 30 stores planning data 32 in memory or a database. Planning data corresponds to configuration aspects of one or more cell sites such as the configuration of one or more cells, configuration of one or more sectors, configuration of connections 16 and/or other data for configuring a new cell site for activation or updating a cell site. In one or more embodiments, a cell site configuration engineer enters the planning data in NMS 30. In one or more embodiments, the planning data becomes part of a managed object model (MOM) in which each connection 16 may be represented as an MOM entry that specifies the cable end points to be connected. The MOM entries may be used by base station 12 as an electronic tag or identifier that is transmitted to device 26 for guiding connection installation as discussed below.

The disclosure is not limited to using MOM entries and may store the planning data in other electronic formats that can be transmitted by base station 12 to device 26 described herein for connection installation guidance. Further, the signaling between base station 12 and device 26 may be based on AISG protocol as is known in the art, but the disclosure advantageously extends the AISG protocol by using AISG's existing framework to support a new AISG vender specific message that carries configuration data such as the connectivity identifier for use in guiding connection installation as described herein. The AISG vender specific message may be transmitted on an out-of-band channel of AISG protocol, an in-band channel or any logical channel. However, the disclosure is not limited to the use of AISG protocol and is equally applicable to standard and non-standard protocols that can carry payload information.

In one or more embodiments, the functions described herein with relation to base station 12 and NMS 30 may be performed by any Radio Access Network (RAN), Core Network (CN) or other network node that can connect or address radios 22 and radio ports 23. As such, NMS 30 functionality may be performed by a server connected to base station 12 via the Internet for example. Similarly, the transmission of planning data such as configuration data may be performed by any node, e.g., via the Internet, that is configured to communicate and/or address specific radios 22 and radio ports 23 of base station 12 via any (in-band or out-of-band) channel. It is contemplated that the functionality described herein may be implemented in other manners and is not limited solely to implementation in base station 12 and/or NMS 30.

Further, the functionality of base station 12 and/or NMS 30 is not limited to functionality/processing within a single node and may be implemented across one or more nodes, such as with distributed/shared processing, in the form of software or instructions which, when executed by one or more processors, cause the one or more nodes to perform the base station 12 and/or NMS 30 functionality described herein.

Figure 2:
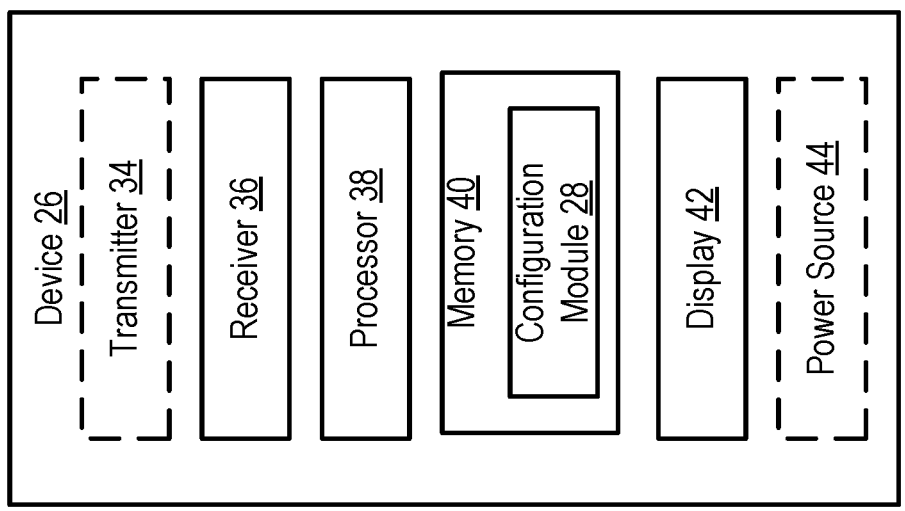
FIG. 2 is a block diagram of an exemplary device in accordance with the principles of the present disclosure.

A block diagram of an exemplary device 26 is described with reference to FIG. 2. In one or more embodiments, device 26 includes transmitter 34 and/or receiver 36 for transmitting data/signaling and/or receiving data/signaling. In one or more embodiments, transmitter 34 and/or receiver 36 are replaced by a modem, transceiver and/or communication interface for transmitting and/or receiving messages or signals. In one embodiment, the modem may be an Antenna Interface Standard Group (AISG) based modem or industry standard AISG modem that is configured to demodulate On-Off-Keying (OOK) messages received from radio 22. Further, the AISG based modem may be configured to obtain power from a Direct Current (DC) carried in connection 16 in a power signal or through a power supply internal to device 26, discussed below. Because one embodiment of device 26 uses AISG messages embedded in an out-of-band signal, the cell site, i.e., base station 12 and radio 22, do not have be radiating or transmitting traffic. This helps ensure the safety of the field technician that is connecting connections 16 as there should be little to no RF emissions from a cell site that is not operating to support live UE traffic. In one or more embodiments, base station 12 may be powered off or locked after the device 26 receives an AISG message.

Device 26 further includes one or more processors 38 configured to perform device 26 functionality as discussed herein. Processor 38 may decode received messages, transmit a reply message, cause storage of the received messages and cause the messages to be displayed, among other functions. For example, processor 38 may decode a message from base band unit 18 and/or NMS 30 in which the decoded message includes a text string or connection identifier such as "Connect to Antenna 101". Processor 38 may cause the connection identifier to be stored in memory 40 and displayed on display 42, both of which are discussed below, thereby helping guide the field technician during connection installation. The disclosure is not limited to receiving and displaying text strings, and may include other characters, symbols, colors, etc. that indicate to the field technician the next hop of connection 16 and/or indicate that the field technician has made the correct connection. In one or more embodiments, device 26 is AISG based device such as an Antenna Line Device (ALD) that is configured to perform the functions described herein. In one embodiment, processor 38 may be in communication with transmitter 34 and/or receiver 36 via a Universal Asynchronous Receiver/Transmitter (UART) interface.

Device 26 includes memory 40 that is configured to store data and/or one or more modules. Memory 40 may include non-volatile and/or volatile memory. For example, non-volatile memory may include a hard drive, flash memory, programmable integrated circuits, memory stick, solid state memory and the like. Also, volatile memory may include random access memory and others known in the art. Memory 40 stores program instructions such as those for configuration module 28. For example, configuration module 28 includes instructions, which when executed by processor 38, cause processor 38 or device 26 to perform a connection installation guidance process, as discussed in detail with respect to FIG. 4. In other embodiments, processor 38 and memory 40 form circuitry (not shown) containing instructions which, when executed cause device 26 to perform the connection installation guidance process described herein. In one or more embodiments, memory 40 stores data from one or more received messages such that device 26 may "recall" data upon request by a user, as discussed in detail with respect to FIG. 7.

Device 26 includes display 42 for displaying data received from one or more messages and/or to provide other information to the user. In one or more embodiments, display 42 is configured to display one or more connectivity identifiers received from one or more messages. The connectivity identifiers are discussed in detail with respect to FIGS. 4 and 7. In one or more embodiments, display 42 is an electronic display panel such as an LCD or LED based panel, among other electronic display panels known in the art. In one or more embodiments, another component may replace or supplement display 42 for guiding cable installation. For example, a speaker may be included in device 26 for providing audible connection guidance such as by reciting one or more connectivity identifiers. In one or more embodiments, device 26 includes one or more power sources 44 for providing power to device 26. For example, power source 44 may be one or more batteries that provide power to device 26 in the absence of a power signal from radio 22. Power source 44 is not limited to batteries and may include other sources of power that are known in the art. The power signal may be a Direct Current (DC) power signal, Alternating Current (AC) power signal or other signals that can deliver power to device 26 as is known in the art.

Figure 3:
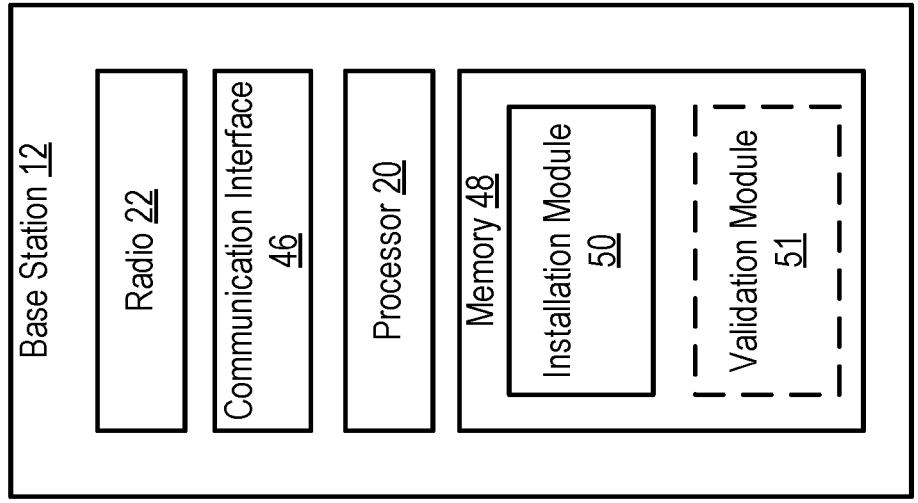
FIG. 3 is a block diagram of an exemplary base station in accordance with the principles of the present disclosure.

A block diagram of an exemplary base station 12 is described with reference to FIG. 3. Base station 12 includes one or more radios 22 in which each radio 22 has one or more radio ports 23 for communicatively coupling to connection 16 or other communication equipment. In one or more embodiments, radio 22 is an RF radio that is configured to transmit and receive RF signals. Each radio port 23 is associated with a respective address such that base station 12 may selectively transmit data to one or more addressed radio ports 23 but not to the other addressed radio ports 23. Base station 12 includes one or more communication interfaces 46 for communicating with NMS 30, radios 22, device 26 and/or other devices and components in system 10.

In one or more embodiments, communication interface 46 communicates configuration data to radio port 23 of radio 22 for transmission over an out-of-band signal where an out-of-band channel is defined in AISG or an in-band signal such as any logical channel embedded in a signal. Further, one or more communication interfaces are configured to receive planning data from NMS 30. In one or more embodiments, the planning data is part of a managed object model (MOM) in which each connection 16 may be represented as an MOM entry that specifies connections 16 to be connected. The MOM entries are used by base station 12 to transmit an electronic tag or identifier to device 26 for guiding connection installation as discussed below. In one or more embodiments, base station 12 requests planning data from NMS 30.

Base station 12 includes processor 20 for performing base station 12 functions as described herein. Base station 12 includes memory 48 that corresponds to memory 40 but with size and functionality varying depending on design need. Memory 48 stores data such as planning data, and one or more modules such as installation module 50 and/or validation module 51. For example, memory 48 stores program instructions such as those for installation module 50. In one embodiment, installation module 50 includes instructions, which when executed by processor 20, cause processor 20 to perform the connection installation process as described with respect to FIG. 5. Memory 48 may also store program instructions such as those for validation module 51. For example, validation module 51 includes instructions, which when executed by processor 20, cause processor 20 to perform a connectivity path validation process as described with respect to FIG. 12.

A flow diagram of an exemplary connection installation guidance process of configuration module 28 is described with reference with FIG. 4. For example, device 26 is in communication with radio 22 via radio port 23. In one or more embodiments, device 26 is connection 16, e.g., a cable such as an RF cable, that includes components of device 26 for performing device 26 functionality. In one or more other embodiment, device 26 is a standalone device that is connected to a connection output of connection 16 associated with a radio port 23 of the plurality of radio ports 23 of base station 12. In one or more embodiments, device 26 communicates with radio 22 using, for example, the AISG protocol after device 26 is connected to the connection output of connection 16 or after device 26 (if device 26 includes connection 16) is connected with radio port 23. With the AISG protocol, base station 12 or NMS 30 transmits configuration data to device 26 from radio port 23 of radio 22 to which device 26 is connected to. In an alternative embodiment, different or additional protocol(s) may be used between radio 22 and device 26 and/or between base station 12 and device 26 to transmit radio specific configuration data to device 26. In yet another embodiment where base station 12 is placed in an installation mode where the cell site is not in service or transmitting data and/or control traffic, the configuration data is continuously or periodically made available at the output of connection 16 that is associated with radio port 23 of radio 22.

Figure 8:
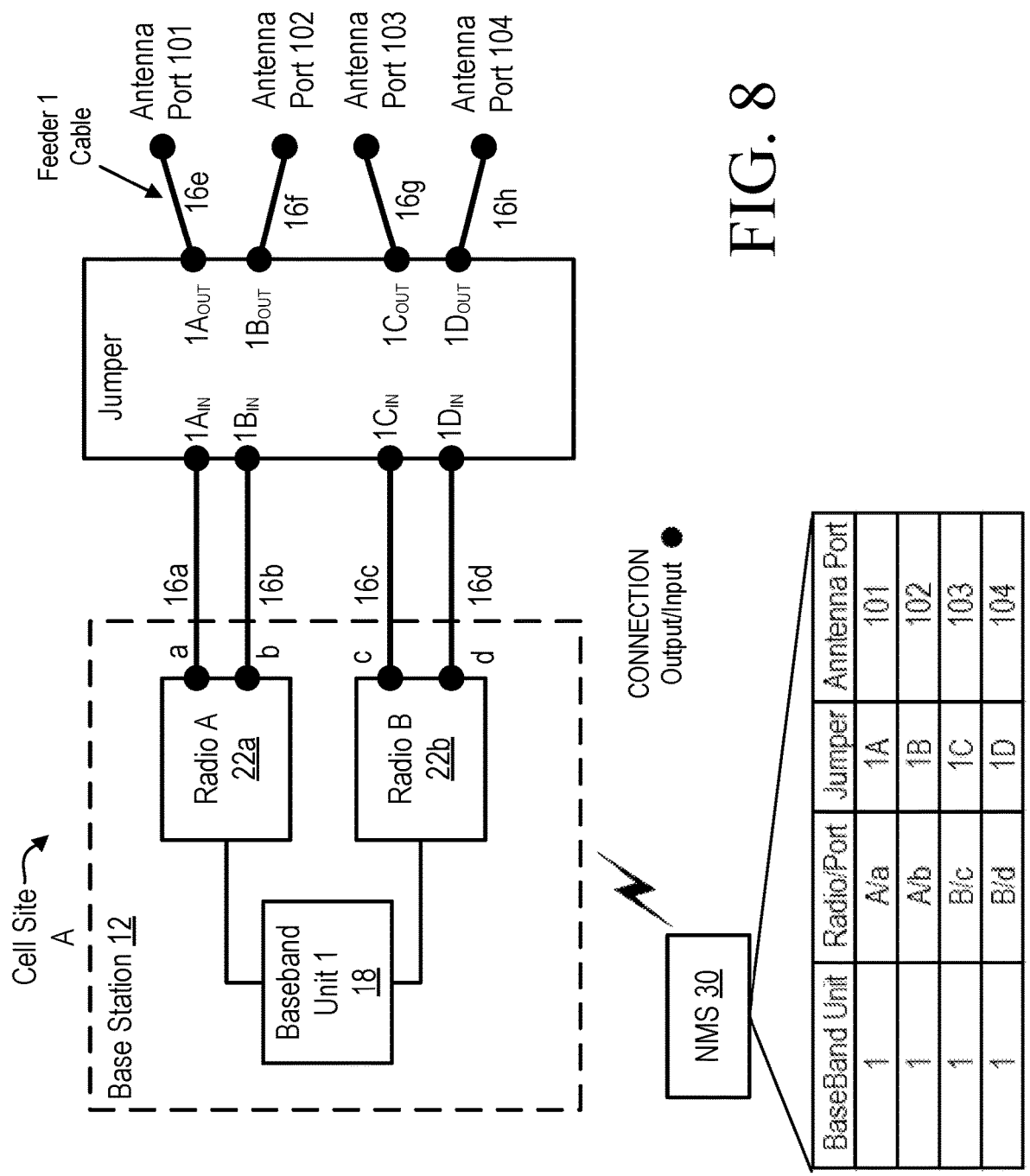
FIG. 8 is one embodiment of the system for guiding connection installation in accordance with the principles of the disclosure.

Receiver 36 receives configuration data that is communicated from radio port 23 (Block S100). For example, first radio port 23 associated with first radio 22 communicates first configuration data that indicates a next connection for the first radio port 23 toward one of the plurality of antennas 14. In other words, configuration data indicates where the field technician should connect a connection output of connection 16. In one embodiment, the configuration data includes a connectivity identifier that identifies each connection 16 hop toward a specific antenna 14. For example, the connectivity identifier may be the following string: "Connect to Jumper 1A/Feeder 1/Antenna 101" that indicates "Jumper 1A" should be connected to "Feeder 1" cable and "Feeder 1" cable should be connected to "Antenna 101" port, as illustrated in FIG. 8 that is discussed below. As is discussed in detail with respect to FIG. 5, the configuration data transmitted from each radio port 23 of each radio 22 may be different as each radio port 23 of radio 22 may have a specific connectivity path and number of hops.

In response to receiving configuration data, processor 38 causes the configuration data to be displayed on display 42 (Block S102). Using the example above, processor 38 causes first configuration data such as text string "Connect to Jumper 1A/Feeder 1/Antenna 101" to be displayed on display 42. Further, processor 38 may cause the configuration data such as the text string to be saved in memory 40 such that device 26 may re-display the text string at a later time, i.e., if the technician or installer presses the "recall" button described in detail with respect to FIG. 7. In one or more embodiments, after device 26 is unconnected from a connection output of first connection 16, device 26 may then be connected to a connection output of second connection 16 in which device 26 will perform the connection guidance process of FIG. 4 with configuration data received from the second connection 16. In one example, a connection output of second connection 16 is in communication with a first connection 16 such that the connection output of second connection 16 outputs the same configuration data as the previous hop, i.e., communicates first configuration data that includes text string "Connect to Jumper 1A/Feeder 1/Antenna 101". In another example, a connection output of second connection 16 is in communication with second radio 22 that communicates second configuration data such as text string "Connect to Jumper 1B/Feeder 2/Antenna 102" that is different from first communication data communicated by first radio 22. In one or more embodiments, if connection 16 includes device 26 components for performing device 26 functionality described herein, connection 16 may be left in the connectivity path even after system 10 goes live or begin to transmits UE data and/or control data.

Figure 5:
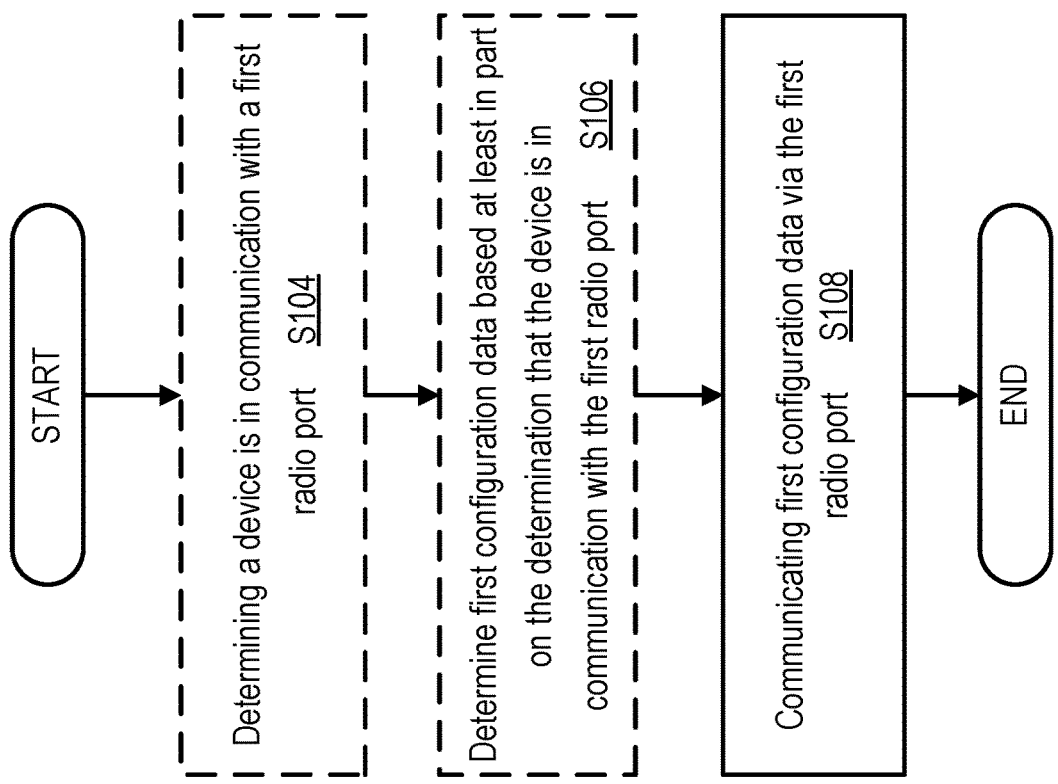
FIG. 5 is a flow diagram of an installation guidance process of installation module in accordance with the principles of the disclosure.

A flow diagram of an exemplary connection installation guidance process of installation module 50 is described with reference with FIG. 5. Processor 20 of base station 12 determines device 26 is in communication with or connected to radio port 23 of radio 22 (Block S104). For example, base station 12 may communicate with device 26 using one or more protocols such that base station 12 is able to identify a specific addressable radio port 23 of radio 22, to which device 26 is connected. Processor 20 of base station 12 determines configuration data based at least in part on the determination that device 26 is in communication with radio port 23 of radio 22 (Block S106). For example, if device 26 is determined by processor 20 to be connected to first radio port 23 of first radio 22, processor 20 determines that first radio port 23, e.g., Radio A/port a, should be in communication with antenna 101 based on the planning data, illustrated in FIG. 8, received from NMS 30. Therefore, processor 20 determines configuration data, e.g., "Baseband 1/Radio A/port a/Jumper1A/Antenna 101" based on the radio port 23 that is in communication with device 26.

Processor 20 causes the configuration data to be communicated from first radio port 23 of radio 22 that is in communication with device 26 (Block S108). In one or more embodiments, Blocks S104 and S106 may be skipped or omitted. For example, base station 12 may make configuration data for respective one or more radio ports 23 of radios 22 available at respective radio ports 23 without determining whether device 26 is connected to a connection output of connection 16 associated with one or more radios 22. In one embodiment, base station 12 is switched to a mode that periodically, continuously or via a predefined schedule transmit configuration data from each radio port 23 of radio 22.

Figure 6:
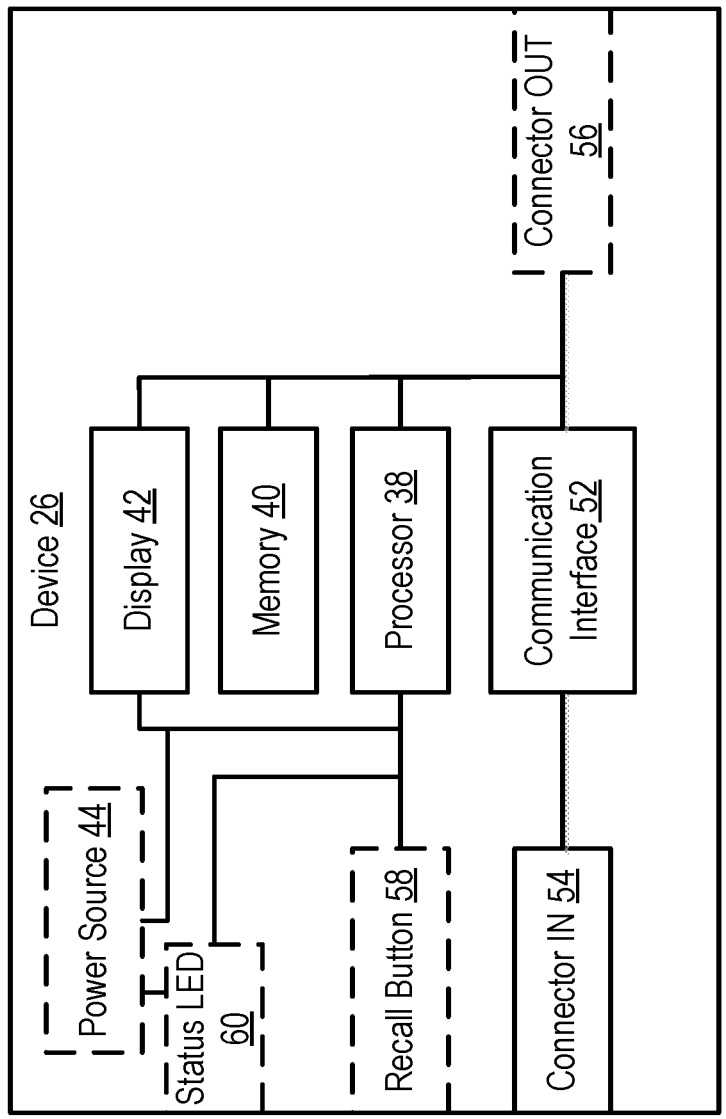
FIG. 6 in a component block diagram if an exemplary device in accordance with the principles of the present disclosure.

A component block diagram of another exemplary device 26 is described with reference to FIG. 6. Device 26 includes processor 38, display 42, power source 44 and communication interface 52 as discussed above with respect to FIG. 2. Device 26 further includes connector IN 54 for receiving communications from base station 12, and connector OUT 56 for re-transmitting received communications from base station 12, e.g., transmitting configuration data, verification messages, other messages and/or other data. Device 26 further includes recall button 58 that is configured to cause device 26 to display stored configuration data. In one or more embodiments, recall button 58 is configured to cause the most recently received configuration data to be displayed. In other embodiments, recall button 58 when repeatedly pressed or pressed and held may cause device 26 to cycle through and display received configuration data or allow a user to recall specific configuration data.

In one or more embodiments, device 26 includes status Light Emitting Diode (LED) 60 that is configured to indicate the status of device 26. For example, activated status LED 60 indicates device 26 is powered and receiving communications from base station 12. One embodiment of device 26 in accordance with the principles of the disclosure is described with reference to FIG. 7. Device 26 includes components described with respect to FIG. 6 in which display 42 is configured to display configuration data associated with a specific radio port 23 of radio 22 and, in some embodiments, to indicate that the current connection is accurate. In one or more embodiments, power source 44, connector OUT 56, recall button 58 and/or status LED 60 may be omitted from device 26. In one or more embodiment, connector IN 54 and connector OUT 56 may be the input and output of connection 16 such as if connection 16 includes one or more components of device 26 for performing device 26 functionality as described herein. For example, in one embodiment an RF cable includes components of device 26 and is configured to perform the functions of device 26 as discussed herein.

A block diagram of one embodiment of system 10 in accordance with the principles of the disclosure is discussed with respect to FIG. 8. In this embodiment, NMS 30 stores planning data for configuration of cell site A that gets pushed or communicated to base station 12 as discussed above and as illustrated in FIGS. 9, 10 and 11. Further, device 26 is iteratively moved and connected to respective connection outputs of connections 16 such that configuration data instructing where to connect a respective connection 16 is displayed on display 42 of device 26. For example, device 26 may be connected to radio A/port a such that device 26 receives configuration data specific to radio A/port a, e.g., "Radio A/Port a to Jumper 1A to Antenna Port 101". The installer or field technician may install connection 16a from radio A/port a to Jumper LAIN. Device 26 may be connected to connection 16a before being connected to Jumper LAIN to verify that the connection output of connection 16a is in communication with radio A/port a, i.e., ensure that the connection input of connection 16a is properly connected to radio A/port a. Device 26 is then connected to Jumper $1A_{OUT}$ in which device 26 receives configuration data specific to radio A/port a, e.g., "Radio A/Port a to Jumper 1A to Antenna Port 101", thereby providing instant feedback that the connection path from radio A/port a reaches Jumper $1A_{OUT}$, i.e., the connectivity path is properly connected thus far. Feeder 1 cable is then connected from Jumper $1A_{OUT}$ to antenna port 101 by the installer or field technician that is following the displayed configuration data. Device 26 may be connected to feeder 1 cable before connection to antenna port 101 where device 26 should receive configuration data specific to radio A/port a if the connectivity path from radio A/port a reaches the end of feeder 1 cable. Therefore, a field technician is able to get instant feedback on whether connection 16 is properly connected according to planning data and is able to determine a next connection 16. The above example using radio A/port a is merely for illustrative purposes as device 26 may be, throughout the installation process, connected to more or less connection outputs of connectors 16, and may receive configuration data only once or several times depending on whether baseband unit 18 remains active/ON throughout the installation, i.e., continues to push/transmits configuration data from one or more radio ports 23.

Figure 9:
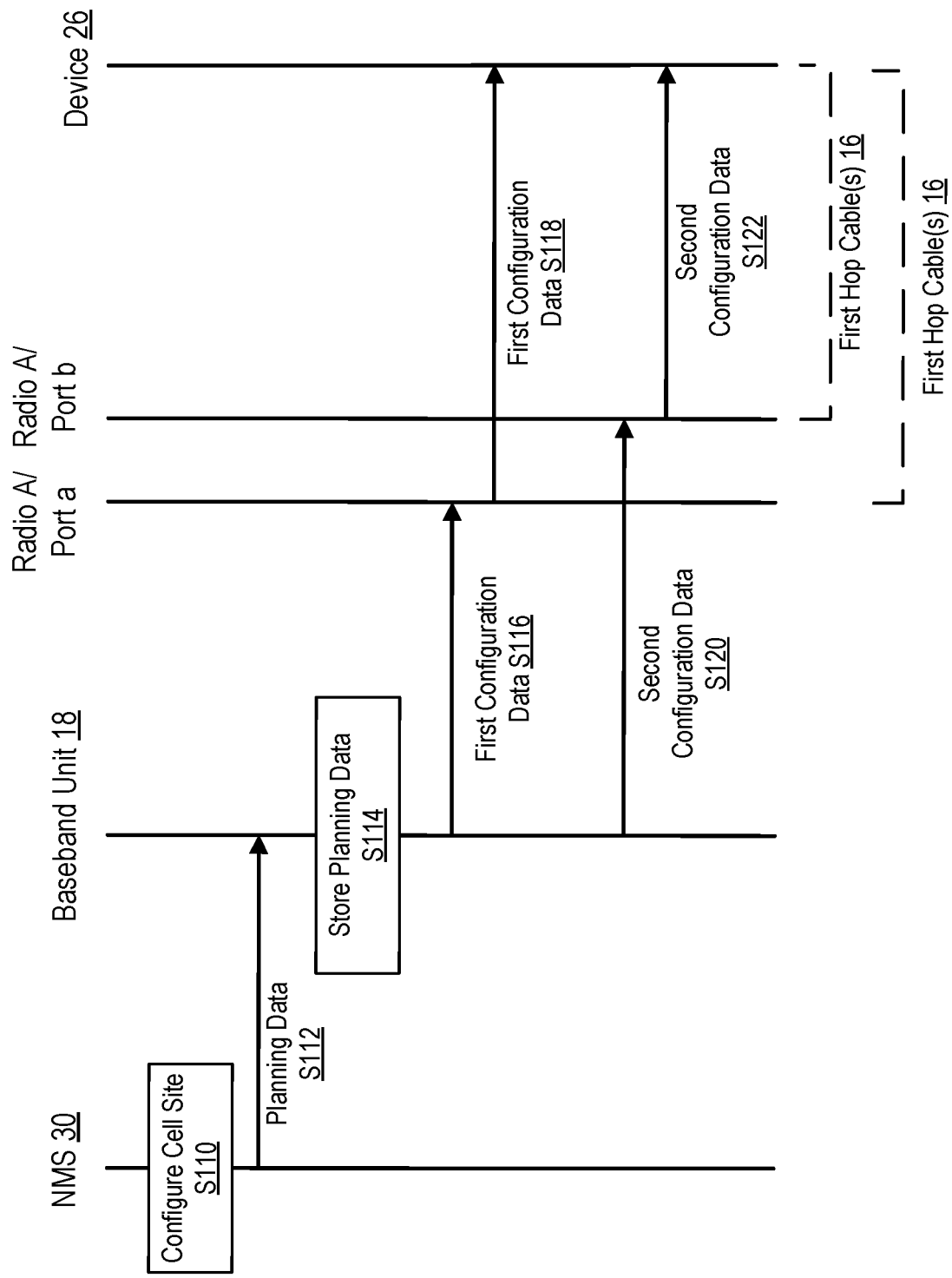
FIG. 9 is a signaling flow diagram of one embodiment of the system in accordance with the principles of the disclosure.

A signaling flow diagram of the operation of one embodiment of system 10 is discussed with reference to FIG. 9. NMS 30 receives configuration of a cell site (Block S110). For example, planning data in NMS 30 may be entered by a configuration engineer. In one or more embodiments, NMS 30 may construct the connector identifiers for each communication path from a respective radio 22 to a respective antenna 14, i.e., constructs connector identifiers from MOM entries. NMS 30 communicates planning data to baseband unit 18 (Block S112). Baseband unit 18 stores the planning data (Block S114). In one or more embodiments, baseband unit 18 temporarily stores the received planning data such as during installation or until system 10 is radiating/transmitting UE traffic and/or control information, among other situations where planning data may be stored for shorter or longer periods of time. In one or more embodiments, planning data may be stored in a MOM database such that each radio port 23 is associated with a respective connector identifier. Baseband unit 18 communicates first configuration data to radio A/port a in which first configuration data, in this example, refers to data that is specific to radio A/port a (Block S116). For example, first configuration data may include text string "Radio A/port a/Jumper1A/Antenna 101". In one or more embodiments, the first configuration data is sent using AISG based message/payloads in which the instant disclosure extends the functionality of AISG by providing this Message between radio 22, i.e., AISG primary, and device 26, i.e., AISG secondary. The payload or connectivity identifier in the message may be vender specific such as "Jumper 1A/Feeder1/Antenna 101" or can take another format that identifies one or more connections 16 toward antenna 14.

Radio A/port a communicates the first configuration data to device 26 that is connected to connection 16, e.g., respective first hop cable (Block S118). Baseband unit 18 communicates second configuration data to radio A/port b in which second configuration data, in this example, refers to data that is specific to radio A/port b (Block S120). In one example, second configuration data may include text string "Radio A/port b/Jumper 1B/Antenna 102". Radio A/port b communicates the second configuration data to device 26 that is connected to connection 16, e.g., another first hop cable 16 (Block S122).

In this embodiment of system 10, baseband unit 18 transmits configuration data from respective radio ports 23 without determining which specific radio port 23 of radio 22 device 26 is in communication with. For example, baseband unit 18 is placed in an installation mode where radios 22 are not transmitting UE traffic. Further, in this installation mode, baseband unit 18 may cause respective configuration data for each radio port 23 of radio 22 to be transmitted simultaneously or substantially simultaneous, and may do so periodically, continuously or according to a predefined signaling schedule. In other words, each radio port 23, e.g., port a, b, c, d, etc., associated with respective one or more radios 22, transmits configuration data that is specific to the radio port 23 such that each radio port 23 transmits different configuration data from the other radio ports 23.

Figure 10:
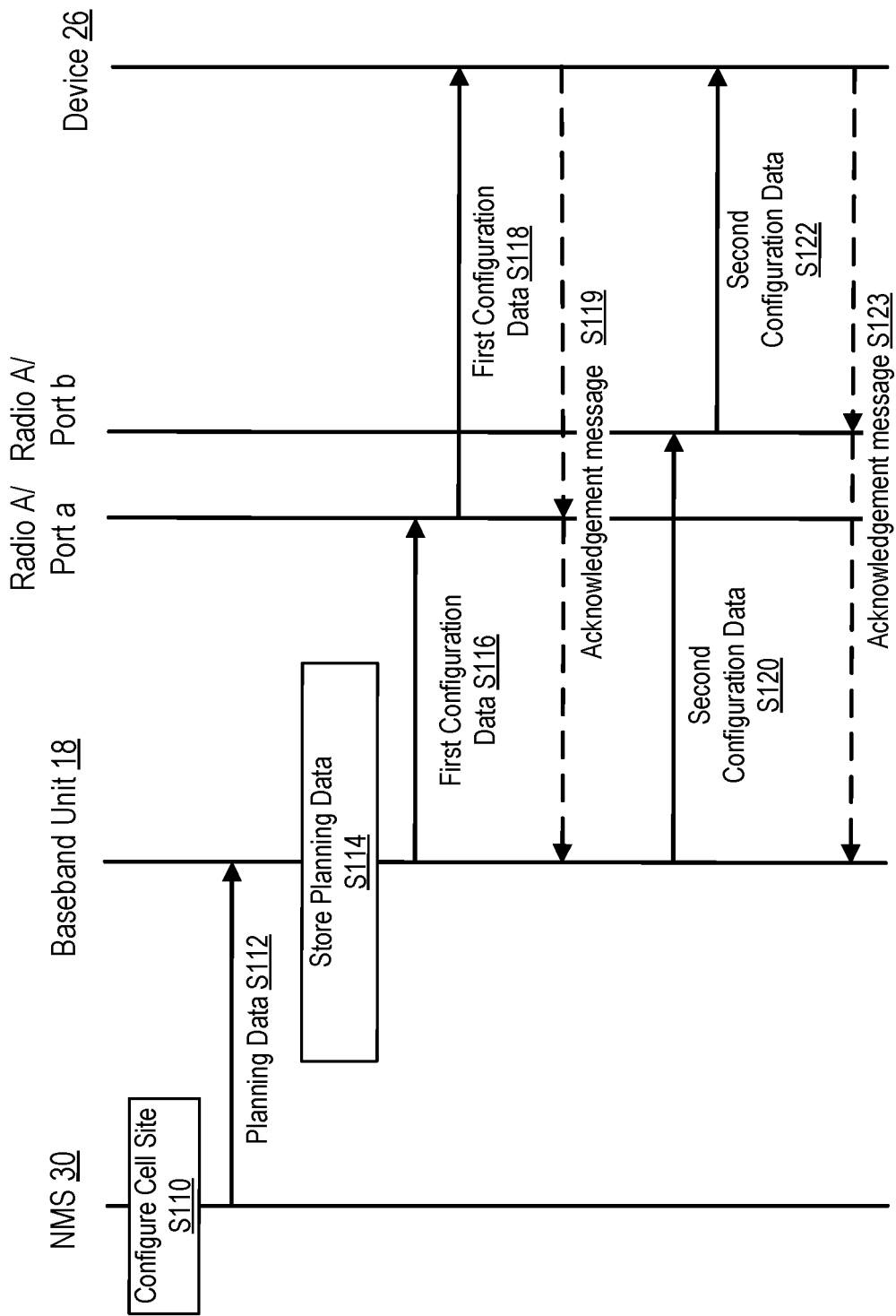
FIG. 10 is a signaling flow diagram of another embodiment of the system in accordance with the principles of the disclosure.

A signaling flow diagram of another embodiment of system 10 in accordance with the principles of the disclosure is discussed with respect to FIG. 10. Blocks S110-S118 and S120-122 are described above with respect to FIG. 9.

Device 26 may then display the received configuration data to the field technician via display 42 as discussed above. While only one connection 16 hop from respective radio ports 23 of radios 22 is illustrated in FIG. 10, device 26 may be used for multiple connection 16 hops such that device 26 is able to receive communication data from baseband unit 18 at various connection outputs of connections 16 if the connections 16 are in communication with a respective radio 22.

Device 26 is further configured to transmit one or more acknowledgement messages (Block S119 and S123). For example, device 26 may transmit an acknowledgement message including at least one connectivity identifier that is specific to the connectivity path to which device 26 is connected. In one or more embodiments, the acknowledgement message is triggered at device 26 by receipt of a verification message at device 26, as discussed in detail with respect to FIG. 12. In other embodiments, the acknowledgment message is manually triggered such as by pressing a one or more buttons of device 26. In yet other embodiments, the acknowledgement message is triggered by receipt of the configuration data at device 26.

Further, in one or more embodiments, the at least one connectivity identifier that is included in the acknowledgement message is manually selected by a user such as an installer by manipulating one or more buttons on device 26. For example, user of device 26 selects a connectivity identifier corresponding to the portion of the connectivity path where device 26 is connected, i.e., "Jumper 1A" if device 26 is connected to Jumper $1A_{OUT}$ that is illustrated in FIG. 8. However, the acknowledgement message is not limited to carrying one or more connectivity identifiers and may carry other data for verifying a connectivity path from radio port 23 of radio 22 to a specific antenna port. Further, the trigger that causes transmission of the acknowledge message is not limited to the examples discussed above, and may include other triggering mechanisms.

Figure 11:
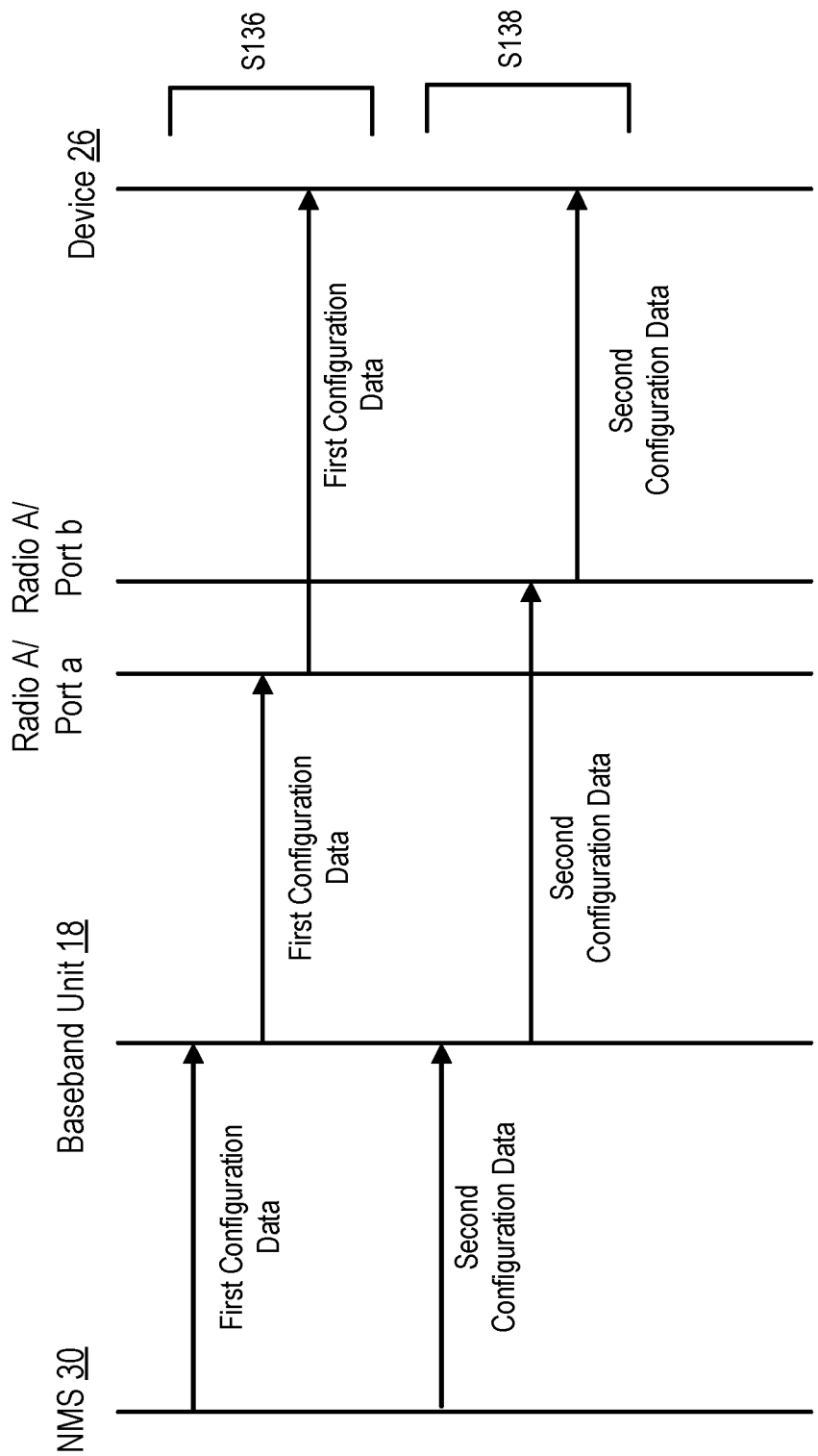
FIG. 11 is a signaling flow diagram of yet another embodiment of the system in accordance with the principles of the disclosure.

A signaling flow diagram of yet another embodiment of system 10 in accordance with the principles of the disclosure is discussed with respect to FIG. 11. In this embodiment, NMS 30 communicates configuration data to baseband unit 18 such that baseband unit 18 can push or communicate the data from addressed radio port 23 of radio 22 (Blocks S136 and S138). In other words, base station 12 is used by NMS 30 to push configuration data to specific radio ports 23 but base station 12 does not perform other actions such determining device 26 location.

Figure 12:
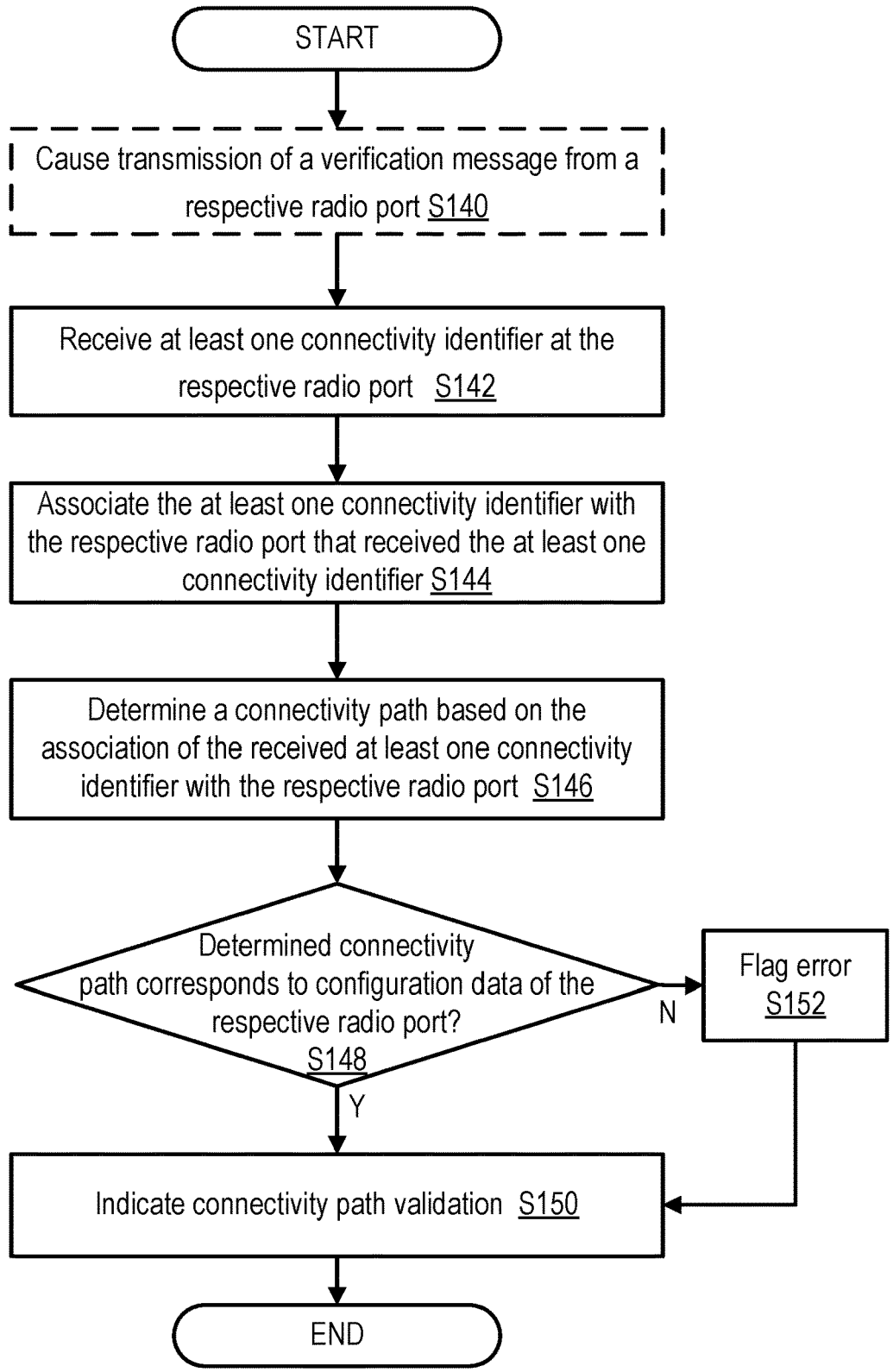
FIG. 12 is a flow diagram of an exemplary connectivity path validation process of a validation module in accordance with the principles of the disclosure.

An exemplary flow diagram for performing connectivity path validation of validation module 51 is described with respect to FIG. 12. One or more devices 26 are part of one or more communication paths connecting one or more radio ports 23 of radios 22 to one or more antennas 14. One example is device 26a in FIG. 1 that is part of a connectivity path from radio port 23a of radio 22a to antenna 14a, but more than one device 26 may be connected to one or more connectivity paths. Processor 20 causes transmission of a verification message from a respective radio port 23 of radio 22 (Block S140). For example, the verification message is used to trigger an acknowledgement message from device 26.

Processor 20 receives one or more connection identifiers at the respective radio port 23 of radios 22 (Block S142). For example, the one or more connection identifiers included in one or more acknowledgement messages are received from one or more devices 26 in a specific connectivity path in communication with the respective radio port 23 of radio 22 that transmitted the verification message. For example, device 26 may transmit a stored connection identifier to respective port 23 of radio 22 in response to receiving the verification message. In one or more embodiments, Block S140 is skipped or omitted such as if one or more different triggering mechanisms are used to trigger an acknowledgment message.

Processor 20 associates each received connection identifier with the respective radio port 23 of radio 22 that received the connection identifier, i.e., processor 20 associates the connection identifier with communication path (Block S144). Processor 20 determines a connectivity path based on the association of the received at least one connectivity identifier with the respective radio port 23 of radio 22 (Block S146). For example, processor 20 may determine a connectivity path to be "Radio A/port b/Jumper 1B/Antenna 102" based on connectivity identifier received at radio A/port b from one or more devices 26 in the connectivity path in communication with Radio A/port b.

Processor 20 determines whether the connectivity path corresponds to configuration data of the respective radio port 23 of radio 22 (Block S148). Using the example of S146, processor 20 determines whether the determined connectivity path of "Radio A/port b/Jumper 1B/Antenna 102" corresponds to configuration data of radio A/port b. If the determination is made that the determined connectivity path corresponds to the configuration data of the respective radio port 23 of radio 22, an indication of connectivity path validation is generated (Block S150). For example, a message may be send to device 26, NMS 30 and/or other device indicating the connectivity path validation. In one or more embodiments, device 26 displays the results of the connectivity path validation via display 42 and/or triggers status LED 60 to indicate validation. Referring back to Block S148, if the determined connectivity path does not correspond to configuration data of the respective radio port, the error is flagged (Block S152). Of note, processor 20 can instead or also be configured to verify a single connection as opposed to an entire path. In one or more embodiments, the error flag specifies the error, e.g., radio port 23 of radio 22 is connected to an incorrect communication path, no response received at radio port 23 of radio 22 that is supposed to be in communication with device 26a, etc. In one or more embodiments, processor 20 can send a notification message to device 26 that is in the wrong communication path such that the message causes display 42 or status LED 60 to visual indicate that there is a problem with the respective communication path. In one or more embodiment, processor 20 can send a notification message via all radio ports 23 of radios 22 such that devices 26 that receive the message will visual indication via display 42 or status LED 60 that these devices are in communication with a radio. This allows the field technician to easily find the one or more devices 26 that did not respond to the identification request message because these devices 26 do not have an activated LED 60 or are not displaying information on display 42 as described in the example above. In one or more embodiments, the verification process of FIG. 12 is equally applicable to one or more connectivity paths from radio port 23 to radio 22 that are not yet completed, i.e., are not in communication with antenna 14, so long as device 26 is part of the partially completed communication path that is in communication with radio 22.

In one or more embodiments, the connectivity path validation process is not limited to being performed or triggered when all connectivity paths and/or connections are completed. For example, the connectivity path validation process may be triggered or performed daily, hourly, etc., to monitor real-time progress of the cell site installation or project. This daily, hourly, etc., triggering may be caused either by use and/or by one or more manual triggers described above, and/or at certain times during the installation process.

Figure 13:
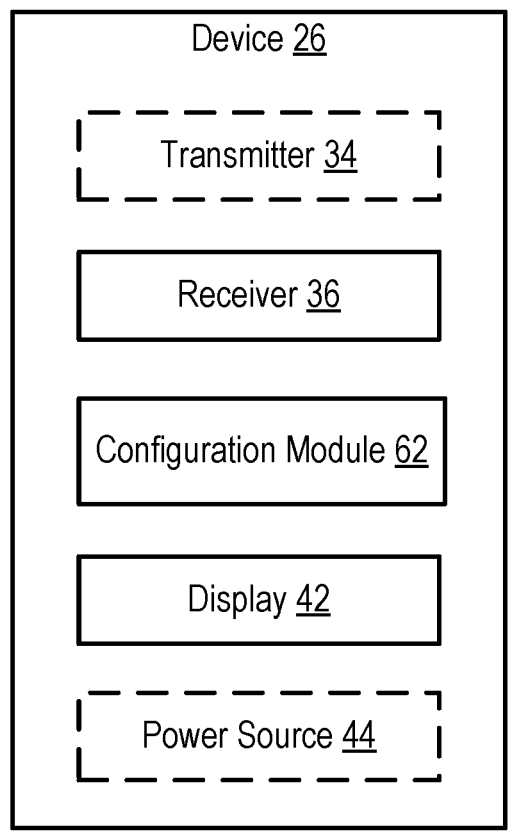
FIG. 13 is a block diagram of yet another embodiment of the device in accordance with the principles of the disclosure.

An exemplary block diagram of an alternative embodiment of device 26 is described with respect to FIG. 13. Device 26 includes components as described in detail with respect to FIG. 2, and also includes configuration module 26 that performs the connection installation guidance process as described in Blocks S100 and S102. For example, configuration module 62 is configured to receive first configuration data that is communicated via the connection output of connection 16 and cause the first configuration data to be displayed on display 42.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings.

It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the disclosure is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A device for guiding connection installation to communicatively connect a plurality of radio ports of a base station to a plurality of antennas, the device comprising:
    a connector, the connector configured to communicate with a first radio port of the plurality of radio ports of the base station;
    a receiver in communication with the connector, the receiver configured to receive first configuration data that is communicated from the first radio port of the plurality of radio ports using an Antenna Interface Standard Group (AISG) protocol communicated in an out of band channel, the first configuration data indicating a next connection for the first radio port toward one of the plurality of antennas, the first configuration data including a connectivity identifier identifying each connection hop toward the one of the plurality of antennas;
    a display; and
    a processor in communication with the receiver and the display, the processor configured to cause the first configuration data to be displayed on the display.

2. The device of claim 1, wherein the connectivity identifier identifies at least one connection toward the one of the plurality of antennas.

3. The device of claim 2, wherein the connectivity identifier identifies a plurality of connections required for the first radio port to communicate with the one of the plurality of antennas.

4. The device of claim 1, wherein the connector is configured to connect to a connection output of a connection associated with the first radio port of the plurality of radio ports of the base station;
    the next connection being a first next connection; and
    the connector is further configured to:
    connect to a connection output of the first next connection; and
    receive the first configuration data indicating a second next connection for the first radio port toward the one of the plurality of antennas.

5. The device of claim 4, wherein the connector is further configured to connect to a second connection output of a second connection associated with a second radio port of the plurality of radio ports of the base station;
    the receiver is further configured to receive second configuration data that is communicated via the second connection output, the second configuration data being different from the first configuration data and indicating a next connection for the second radio port toward another one of the plurality of antennas; and
    the processor is further configured to cause the second configuration data to be displayed on the display.

6. The device of claim 5, wherein each of the first and second connections is one of a cable, jumper component, passive component and active component.

7. The device of claim 1, wherein the device is configured to receive a power signal from the first radio port of the plurality of radio ports of the base station.

8. The device of claim 7, further comprising a power source, the power source configured to power to the device in the absence of the power signal.

9. The device of claim 1, further comprising a transmitter;
    the receiver is further configured to receive a verification message communicated from the first radio port of the plurality of radio ports of the base station; and
    the processor is further configured to cause the transmitter to transmit an acknowledgement message to the base station in response to the verification message.

10. The device of claim 9, wherein the acknowledgement message includes at least one connectivity identifier that identifies at least one connection toward the one of the plurality of antennas.

11. The device of claim 1, further comprising a second connector, the second connector configured to communicate first configuration data toward the one of the plurality of antennas.

12. The device of claim 1, wherein the device comprises one of a Radio Frequency (RF) cable and an RF jumper device.

13. A method for a device to guide connection installation to communicatively connect a plurality of radio ports of a base station to a plurality of antennas, the device being in communication with a first radio port of the plurality of radio ports of the base station, the method comprising:
    receiving first configuration data that is communicated from the first radio port of the plurality of radio ports using an Antenna Interface Standard Group (AISG) protocol communicated in an out of band channel, the first configuration data indicating a next connection for the first radio port toward one of the plural of antennas, the first configuration data including a connectivity identifier identifying each connection hop toward the one of the plurality of antennas; and
    causing the first configuration data to be displayed on the display.

14. The method of claim 13, wherein the connectivity identifier identifies at least one connection toward the one of the plurality of antennas.

15. The method of claim 14, wherein the connectivity identifier identifies a plurality of connections required for the first radio port to communicate with the one of the plurality of antennas.

16. The method of claim 13, wherein the next connection is a first next connection, the device being connected to a connection output of the first next connection; and
    the method further comprising receiving the first configuration data indicating a second next connection for the first radio port toward the one of the plurality of antennas.

17. The method of claim 13, wherein the device is connected to a first connection output of a first connection associated with the first radio port of the plurality of radio ports of the base station; and the device being further connected to a second connection output of a second connection associated with a second radio port of the plurality of radio ports of the base station;

the method further comprising:

receiving second configuration data that is communicated via the second connection output, the second configuration data being different from the first configuration data and indicating a next connection for the second radio port toward another one of the plurality of antennas; and causing the second configuration data to be displayed on a display.

18. The method of claim 17, wherein each of the first and second connections is one of a cable, jumper component, passive component and active component.

19. The method of claim 13, further comprising receiving a power signal from the first radio port of the plurality of radio ports of the base station.

20. The method of claim 13, further comprising:

receiving a verification message communicated from the first radio port of the plurality of radio ports of the base station; and transmitting an acknowledgement message to the base station in response to the verification message.

21. The method of claim 20, wherein the acknowledgement message includes at least one connectivity identifier that identifies at least one connection toward the one of the plurality of antennas.

22. The method of claim 13, further comprising communicating first configuration data toward the one of the plurality of antennas.

23. The method of claim 13, wherein the device comprises one of a Radio Frequency (RF) cable and RF jumper device.

24. A system for guiding connection installation, the system comprising:

a base station, the base station including:

a plurality of radio ports, the plurality of radio ports including a first radio port;

a base station processor, the base station processor configured to communicate first configuration data via the first radio port; and a device, the device including:

a connector, the connector configured to communicate with the first radio port of the plurality of radio ports of the base station;

a receiver in communication with the connector, the receiver configured to receive the first configuration data that is communicated from the first radio port of the plurality of radio ports using an Antenna Interface Standard Group (AISG) protocol communicated in an out of band channel, the first configuration data indicating a next connection for the radio port toward one of the plurality of antennas, the first configuration data including a connectivity identifier identifying each connection hop toward the one of the plurality of antennas;

a display; and a device processor in communication with the receiver and the display, the device processor configured to cause the first configuration data to be displayed on the display.

25. The system of claim 24, wherein the base station processor is further configured to:

determine that a device is in communication with the first radio port; and determine first configuration data based at least in part on the determination that the device is in communication with the first radio port.

* * * * *